United States Patent
Satoh et al.

[11] Patent Number: 6,140,898
[45] Date of Patent: Oct. 31, 2000

[54] INHIBITOR SWITCH HAVING MAGNETIC CONTACT PORTION

[75] Inventors: Shunichi Satoh; Shinya Nakamura; Tetsuya Tomotoshi, all of Tokyo, Japan

[73] Assignee: Niles Parts Co., Ltd., Tokyo, Japan

[21] Appl. No.: 09/386,002

[22] Filed: Aug. 30, 1999

[30] Foreign Application Priority Data

Aug. 31, 1998 [JP] Japan .................................. 10-260913

[51] Int. Cl.⁷ .................................................. H01H 9/00
[52] U.S. Cl. ............................................. 335/207; 200/11 R
[58] Field of Search ....................... 335/205–7; 200/11 A, 200/11 D, 11 R, 61.88, 61.91, 61.96

[56] References Cited

U.S. PATENT DOCUMENTS

| | | | |
|---|---|---|---|
| 5,023,414 | 6/1991 | Mihara et al. | 200/61.91 |
| 5,440,087 | 8/1995 | Cobb, III | 200/61.88 |
| 5,693,925 | 12/1997 | Yamada et al. | 200/61.88 |
| 5,811,747 | 9/1998 | Taniguchi et al. | 200/61.88 |
| 5,949,041 | 9/1999 | Sakairi et al. | 200/61.88 |
| 5,977,496 | 11/1999 | Halberg et al. | 200/61.88 |

FOREIGN PATENT DOCUMENTS 59-146222  9/1984  Japan .

*Primary Examiner*—Lincoln Donovan
*Attorney, Agent, or Firm*—Ronald P. Kananen; Rader, Fishman & Grauer

[57] ABSTRACT

An inhibitor switch is constructed such that a movable base 1 adapted to be rotatable in accordance with the transmission operating position of an automatic transmission device is supported rotatably by a cover body 2 and a pole base 3 having magnetic sensors 9. The movable base 1 is integrally formed with a yoke 5 through an injection molding method. The yoke 5 has folded sections 5c exposed to the upper surface of the movable base 1 and bottom pieces 5b for receiving the permanent magnets 4. Moreover, the yoke 5 is composed of a plurality of bottom pieces 5b connected with each other, and the folded sections 5c formed at each end of the bottom pieces 5c. With this construction, an inhibitor switch is provided with a low manufacturing cost.

11 Claims, 5 Drawing Sheets

INHIBITOR SWITCH HAVING MAGNETIC CONTACT PORTION

RELATED APPLICATIONS

The subject matter of this application is related to the subject matter of the Applicants' copending applications Ser. No. 09/386,193 filed Aug. 30, 1999, and Ser. No. 09/386,194 filed Aug. 30, 1999.

BACKGROUND OF THE INVENTION

1. Field of the Invention

The present invention relates generally to an inhibitor switch for switching contacts according to the positions of an automatic transmission device used for automobiles, and particularly to an improvement of an inhibitor switch in which the contact portion is composed of a magnetic sensor and a permanent magnet.

2. Description of the Related Art

A conventional inhibitor switch is described, for example, in Japanese Utility Model Publication Laid-Open No. 59-146222. This prior art switch has a permanent magnet fitted in a lever by using an adhesive. A printed substrate provided with a magnetic flux detecting element is molded in a main body through an injection molding method. Inhibitor switches for automatic transmission devices require a high precision for proper operation of the contact sections thereof. In the conventional inhibitor switches, cutting works have been provided for obtaining a precise dimension of the permanent magnet.

The conventional inhibitor switch mentioned above has the problem that since the precision in the dimension of the permanent magnet is obtained by cutting works, manufacturing cost thereof becomes extremely high.

SUMMARY OF THE INVENTION

It is an object of the present invention to provide an inhibitor switch that solves the problems found in the conventional inhibitor switch described above.

More specifically, it is an object of the present invention to present an inhibitor switch with a low manufacturing cost.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to achieve the objects set forth above, an inhibitor switch is provided comprising a movable base provided with permanent magnets and adapted to be rotated in accordance with the transmission operating position of an automatic transmission device, a pole base provided with magnetic sensors for detecting the magnetic flux from the permanent magnets, and a cover body for rotatably supporting the movable base in cooperation with the pole base. The inhibitor switch of the present invention is characterized in that the movable base is inserted with a yoke for mounting the permanent magnet by using an injection molding method.

According to another aspect of the present invention, the yoke is provided with folded sections each one end of which is exposed on the upper surface of the movable base, and bottom pieces on which the permanent magnets are mounted, respectively.

The yoke is composed such that each of the bottom pieces is formed in an arc shape with the center of a cylindrical shaft section which is the same center as that of the movable base and sequentially disposed, and each of the folded sections is provided on each end of the bottom pieces.

The movable base is integrally formed with a cylindrical shaft section and a movable arm mounted with the yoke, and further integrally formed with projection sections to be slidably contacted to sliding surfaces of the pole base, respectively, at the inner and outer peripheries of the cylindrical shaft section, respectively.

Each of the permanent magnets is composed of a magnetic body mounted within the hollowed portion formed with bottom pieces and the folded sections of the yoke by using an injection molding method. The yoke is provided with gate holes for injecting the magnetic body to form the permanent magnets on the bottom pieces.

The pole base has a bottom surface formed as an arc shape with the center of the shaft hole so as to form a space rotatably receiving the movable base. Conductive bodies are inserted into the bottom surface through the injection molding method and electrically connected to a substrate mounted with the magnetic sensors. A shaft hole is provided at the end portion of the bottom surface for coupling with the cylindrical shaft section. A sliding surface is formed at the outer periphery of the shaft hole for allowing the sliding motion of the projected section, and a sliding surface is formed at the periphery of the bottom surface for allowing the sliding motion of the projected section.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

An inhibitor switch according to a preferred embodiment of the present invention will now be described in detail with reference to FIGS. 1 to 8 of the accompanying drawings.

Figure 2:
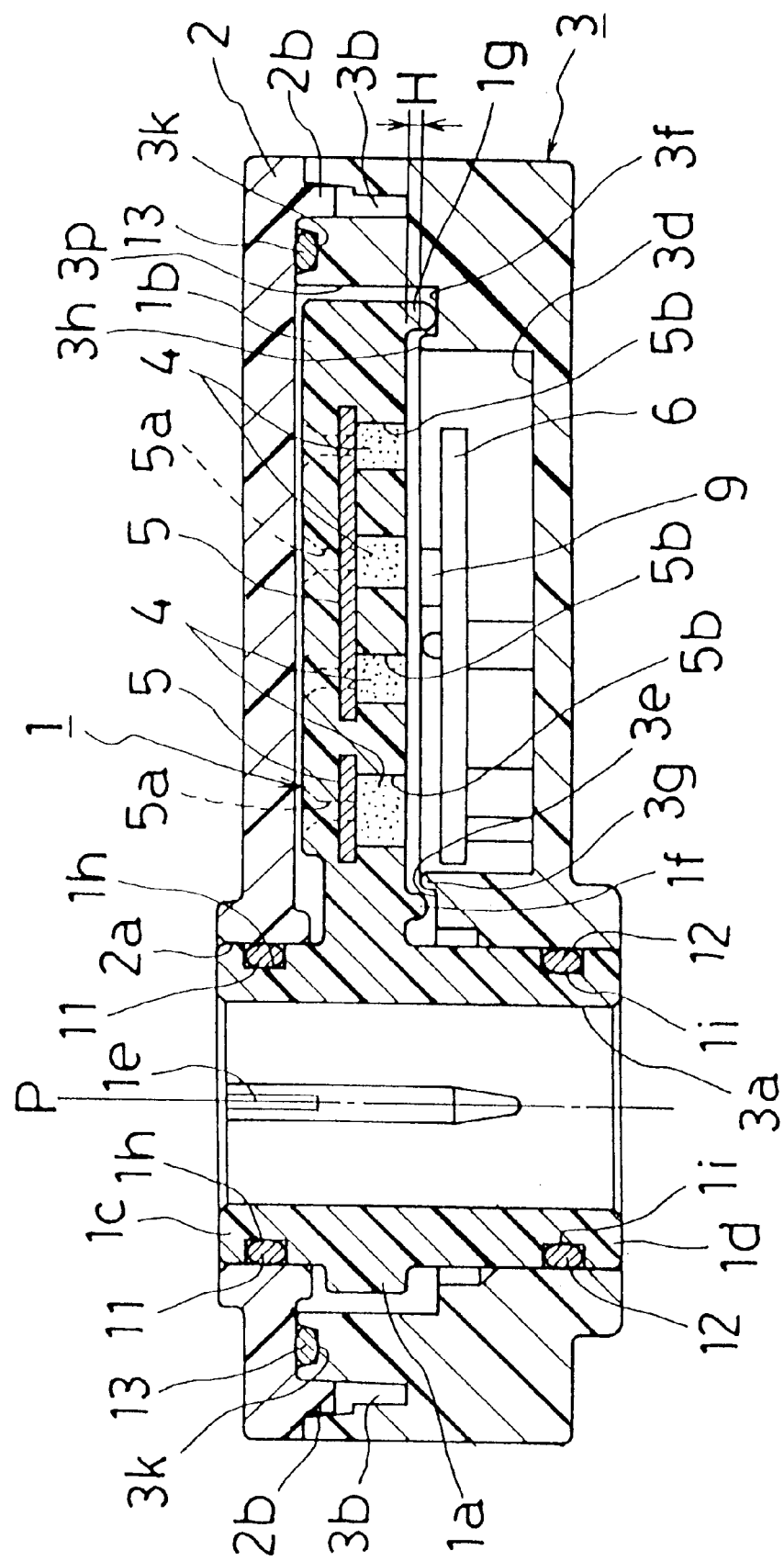
FIG. 2 is a central enlarged sectional view of the inhibitor switch of the present invention.

A movable base 1 is integrally formed with a cylindrical shaft section 1*a* of an automatic transmission device into which a transmission lever shaft (not shown) is inserted, and a movable arm 1*b* having permanent magnets 4 and a yoke 5. As shown in FIG. 2, the movable base 1 is rotatably supported by a cover body 2 and a pole base 3 in such a manner that the upper cylinder shaft section 1*c* of the cylindrical shaft section 1a is fitted with the shaft hole 2a of the case body 2. Further, the lower cylinder shaft section 1d of the cylindrical shaft section 1a is fitted with the shaft hole 3a of the pole base 3. The cylindrical shaft section 1a may be either directly coupled with the transmission lever shaft, or indirectly coupled with a shaft (not shown) that interlocks with the transmission lever shaft.

Figure 3:
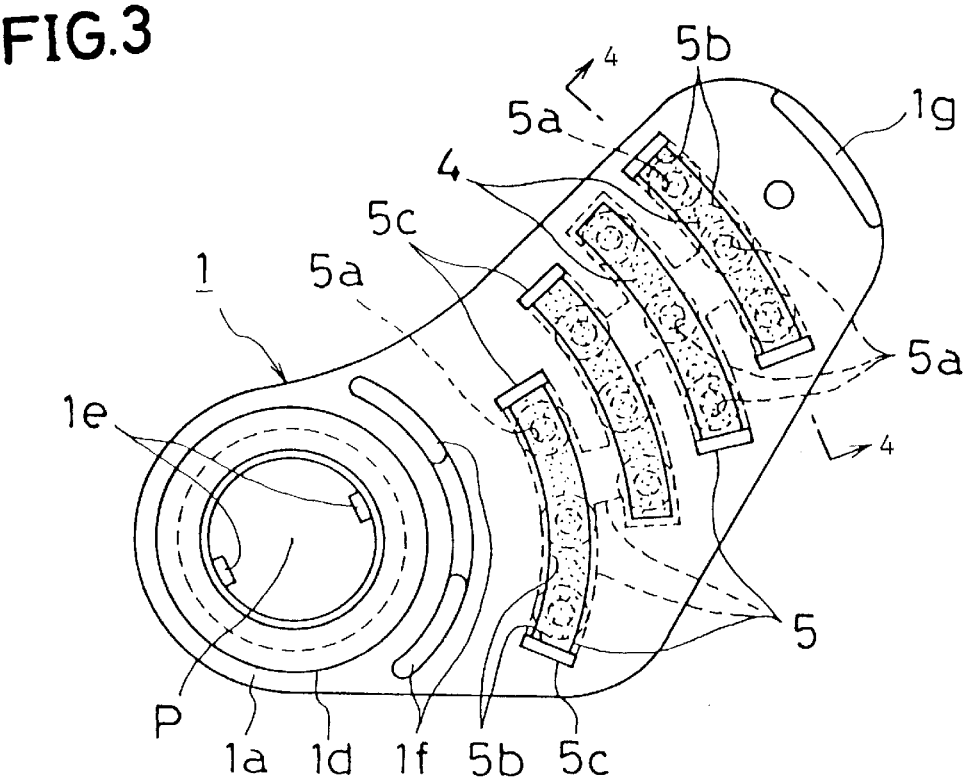
FIG. 3 is an enlarged bottom view showing the movable base of the inhibitor switch of the present invention.
Figure 4:
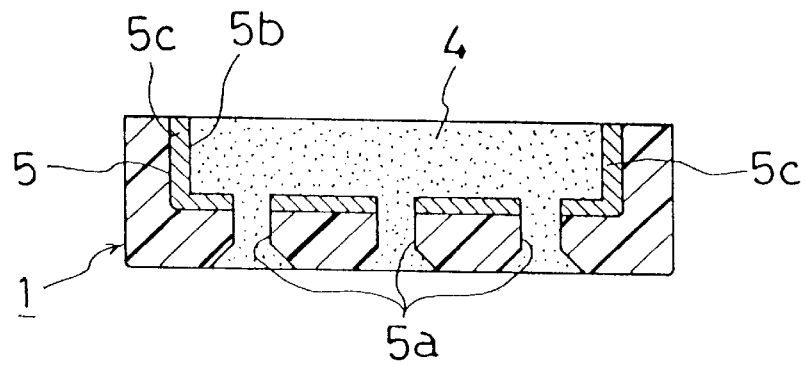
FIG. 4 is an enlarged sectional view taken along the line 4—4 in FIG. 3.
Figure 5:
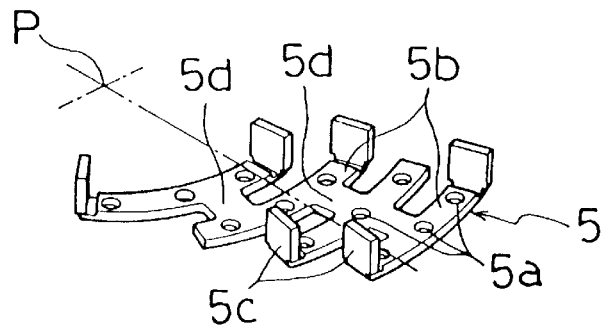
FIG. 5 is a perspective view showing the yoke of the inhibitor switch of the present invention.

As shown in FIGS. 3 to 5, the yoke 5 is formed such that four arc-shaped iron plates are connected with each other integrally, each of the iron plates being formed as an approximate U-letter shape. The iron plates are further formed with gate holes 5a at the approximate center portion of each of four bottom surfaces, respectively. Moreover, the permanent magnet 4 is not limited in terms of its kind, material and the like.

In an example for manufacturing the movable base 1, pins (not shown) are at first inserted into the gate holes 5a, respectively, and then the yokes 5 are molded with resin by using an injection molding method. The yokes 5 of the movable base 1 are primary molded products made by using the injection molding method. The portion of the yokes 5 at which the bottom pieces 5b and folded sections 5c are exposed is made as a hollowed portion. This primary molded product is then set on a metal mold used for forming the permanent magnet. Then, the mixture of neodymium powder (magnetic material) and PPS pellets (also referred to as a bonded magnet or a plastic magnet), is injected onto the bottom piece 5b of the hollowed portion of the yoke 5, thereby forming the permanent magnet 4 as a secondary molded product. Thus, the manufacture of the movable base 1 is finished.

Moreover, as shown, for example, in FIGS. 3, 4 and 5, since each of the gate holes 5a is provided at the approximate center portion of each permanent magnet 4, each permanent magnet 4 is effectively prevented from dropping out. The number of gate holes 5a can be varied. For example, in the case where a single gate hole 5a is mounted on the bottom piece 5b, it is set at an approximate center portion of the bottom piece 5b. Furthermore, as shown in FIG. 4, the movable base 1, the yoke 5, and the permanent magnet 4 are aligned on a single surface upon which the permanent magnets 4 of the movable base 1 are exposed.

Figure 1:
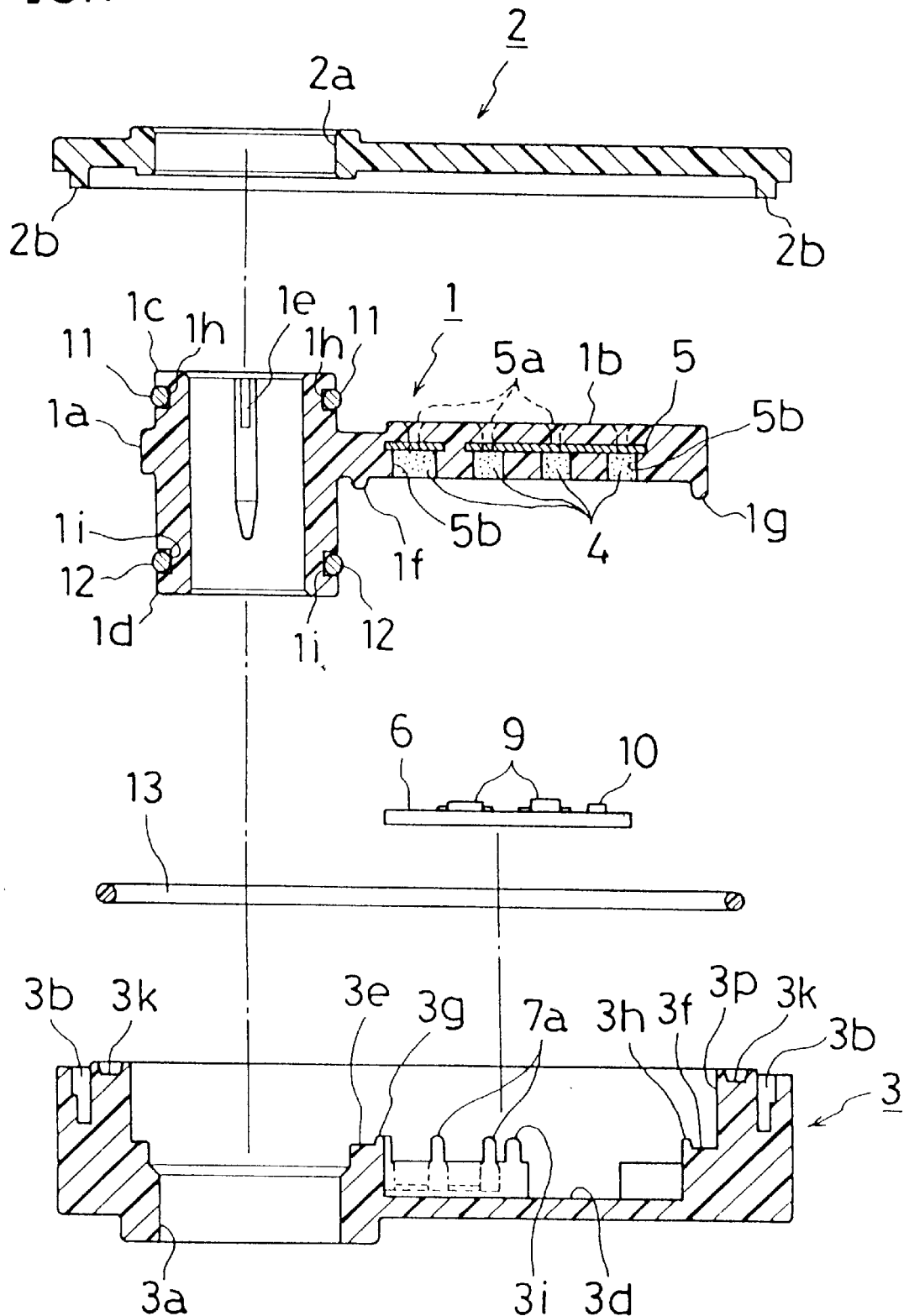
FIG. 1 is an exploded sectional view of an inhibitor switch according to a preferred embodiment of the present invention.

As shown in FIGS. 1 and 2, the cylindrical shaft section 1a is formed with a key 1e to be fitted to the key slit of the transmission lever shaft at the inner wall of the cylindrical shaft section 1a, and formed with grooves 1h and 1i for receiving O-rings 11 and 12 at the periphery of the cylindrical shaft section 1a, respectively. The hermetic property between the cover body 2 and the cylindrical shaft section 1a is increased by the O-ring 11 fitted into the groove 1h, and the hermetic property between the pole base 3 and the cylindrical shaft section 1a is increased by the O-ring 12 fitted into the groove 1i.

As shown in FIG. 3, at the upper surface of the movable arm 1b, four arc-shaped permanent magnets 4 and the folded section 5c of the yoke 5 are disposed at both ends of the permanent magnet 4. Moreover, at the lower side surface of the movable arm 1b, projected sections 1f and 1g formed integrally with the movable arm 1b are projected at the periphery of the lower side shaft section 1d and the outer periphery of the movable arm 1b, respectively. Each end of the projected sections 1f and 1g is formed with a semi-circle-shaped section, thereby enabling a slidable operation on the periphery of the shaft hole 3a of the pole base 3, and further the sliding surfaces 3e and 3f of the outer periphery of the bottom surface 3d of the pole base 3, respectively.

As shown in FIGS. 1 and 2, the cover body 2 has a shaft hole 2a to be fitted to the upper side shaft section 1c and a ring-shaped projection 2b to be fitted to a coupling groove 3b formed on the peripheral lower surface of the pole base 3. The cover body 2 and the pole base 3 are made of a resin material having oil proof and heat resistance properties, and an ultrasonic welding can be easily applied to such resin material. Such resin material may be nylon resins, polypropylene or the like. The cover body 2 may be fitted to the pole base 3 through the movable base 1 and the substrate 6, and then the coupled portion between the coupled groove 3b and the ring-shaped projection 2b is welded to achieve a hermetic seal by using an ultrasonic welding or a vibration welding.

Figure 6:
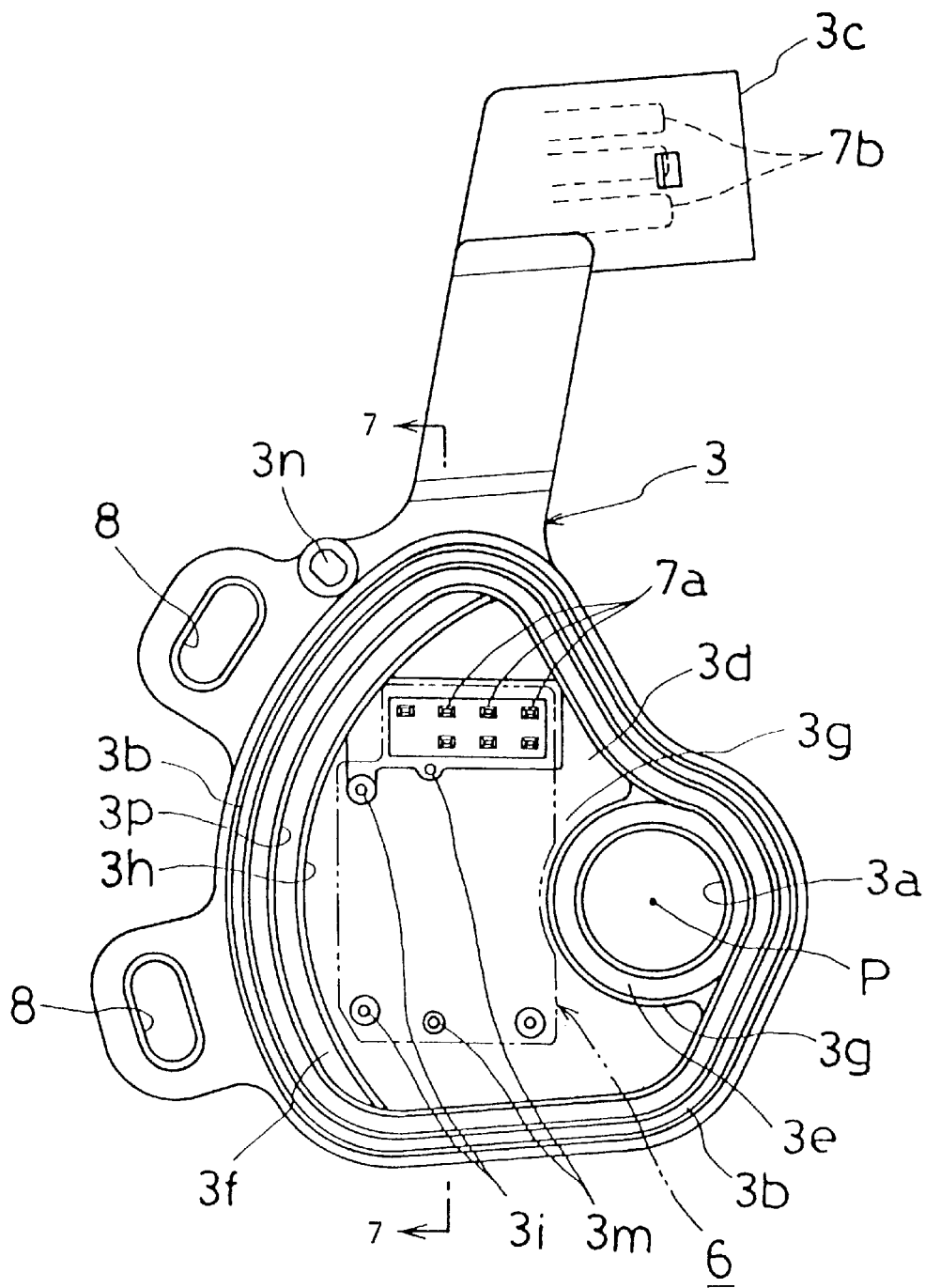
FIG. 6 is a plan view showing the pole base of the inhibitor switch of the present invention.

The pole base 3 is formed so that a conductive body 7 and metallic rings 8 are inserted therein, and may be fixed by using screws passing through the metallic rings 8, respectively, at the outer side of the automatic transmission device. As shown in FIG. 6, one of the connecting sections 7a of the conductive body 7 integrally formed with the pole base 3 is projected from the bottom surface 3d, and the other of the conductive body 7 is projected into a connector section 3c as terminals 7b. The pole base 3 provides a slide surface 3e on which the projected section 1f mounted at the lower surface of the movable base 1 can slide, at the outer periphery of the shaft hole 3a. Moreover, the pole base 3 provides a slide surface 3f on which the projected section 1g mounted at the lower surface of the movable base 1 can slide, at the outer periphery of the bottom surface 3d.

As shown in FIGS. 1, 2 and 6, the slide surfaces 3e and 3f are made smoothly in order to increase the sliding property between the movable base 1 and the projected sections 1f and 1g. The pole base 3 has a shaft hole 3a at the inner side of the slide surface 3e, and an outer periphery 3g at the outer side of the slide surface 3e adjacent thereto, so as to guide the projected section 1f. Moreover, the pole base 3 has an inner side periphery 3h at the side of the shaft hole 3a of the slide surface 3f, and an inner wall 3p at the outside of the slide surface 3f, so as to guide the projected section 1g sliding adjacent thereto.

The slide surfaces 3e and 3f are provided with the inner and outer periphery edges 3g and 3h each end of which is rounded so as to guide the movable base 1. The pole base 3 is formed with a groove 3k to be inserted with a packing 13 for sealing the contact surface, which is located at the periphery of the bottom surface 3d between the cover body 2 and the pole base 3. Moreover, numeral 3n in FIG. 6 denotes a hole for positioning the shaft of the transmission lever of the automatic transmission device.

The yoke 5 is a molding frame for forming the desired shape of the permanent magnet 4 which is formed with magnetic material by using the injection molding method. The yoke 5 has the bottom pieces 5b composing the bottom of the hollowed portion when the permanent magnet 4 is inserted into the movable base 1 as being the primary molded product during the injection molding operation. Moreover, the yoke 5 has the folded section 5c exposed to the upper surface of the movable base 1, the bottom pieces 5b forming the hollowed portion for receiving the permanent magnets 4, respectively, gate holes 5a, and interlocking sections 5d for interlocking the bottom pieces 5b. As shown in FIGS. 3 and 5, the yoke 5 is composed of plural bottom pieces 5b interlocked with the interlocking sections 5d, and the folded section 5c for forming the hollowed portion at the end portion of each of the bottom pieces 5b upon the primary production of the movable base 1. Each of the bottom pieces 5b is made of an arc-shaped piece centered about an axis P of the cylindrical shaft section 1a of the movable base 1.

Figure 7:
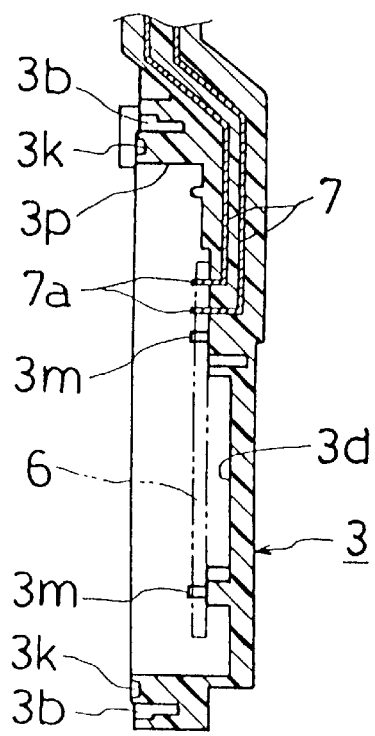
FIG. 7 is an enlarged sectional view taken along the line 7—7 in FIG. 6.

As shown in FIGS. 6 and 7, the substrate 6 is mounted in such a manner that the connecting sections 7a of the conductive body 7 projected from the bottom surface 3d of the pole base 3 are inserted into the through holes 6b, respectively, and welded by using solder. Moreover, as shown in FIGS. 6 and 8, two projections 3m projected from the bottom surface 3d of the pole base 3 are inserted into the positioning hole 6c and the position adjusting hole 6d, respectively, thereby positioning the substrate 6 at the predetermined position within the pole base 3, and then screws are used for fixing the substrate 6 by being inserted into the through holes 6a and screwed into the blind holes 3i.

Figure 8:
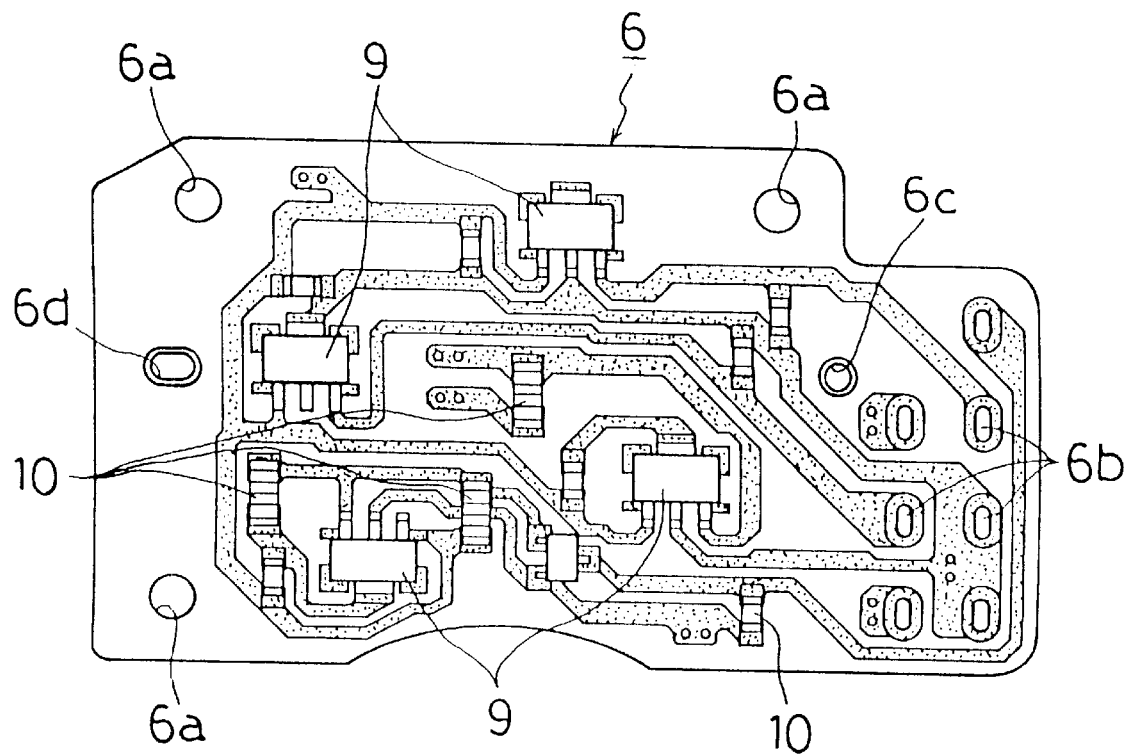
FIG. 8 is an enlarged plan view showing the substrate of the inhibitor switch of the present invention.

As shown in FIG. 8, the positioning hole 6c is a circle mounted at the standard position for the substrate 6. The position adjusting hole 6d is an elongated hole for enabling a fine adjustment of the position for the substrate 6. The substrate 6 is mounted with electronic elements 10 and a plurality of the magnetic sensors 9 which respond to the magnetic flux due to the permanent magnets 4, which are disposed opposite to the magnetic sensors 9. The magnetic sensors 9 may be Hall-effect devices, Hall ICs, MR elements or the like for detecting the magnetic flux. The magnetic sensors 9 are disposed so that they do not contact with the movable base 1, as shown in FIG. 2. The gap H between the magnetic sensor 9 and the permanent magnet 4 may be about 0.1 mm to 0.6 mm.

The operation of the embodiment of the present invention constructed as described above will now be described in detail hereinafter.

When a driver operates the shift lever, the transmission operating position of the automatic transmission device for automobiles is changed. At that time, the movable base 1 received within the inhibitor switch is rotated around the cylindrical shaft section 1a in accordance with the movement of the shift lever, and the permanent magnets 4 are also moved in accordance with the shift lever. The magnetic sensor 9 of the substrate 6 mounted at the position adjacent to the movable base 1 detects the transmission operating position in response to the change of the magnetic flux due to the movement of the permanent magnet 4.

The present invention thus constructed has the following advantages and effects.

The inhibitor switch has a movable base provided with a permanent magnet and adapted to be rotated in accordance with the transmission operating position of an automatic transmission device, a pole base provided with magnetic sensors for detecting the magnetic flux from the permanent magnets, and a cover body for rotatably supporting the movable base in cooperation with the pole base. The inhibitor switch is characterized in that the movable base is inserted with a yoke for mounting the permanent magnet by using an injection molding method. Therefore, it becomes possible to integrally form the permanent magnets for generating magnetic flux to be sensed by the magnetic sensor on the movable base with high precision, thereby increasing the precision of the inhibitor switch and lowering the manufacturing cost.

The yoke of the inhibitor switch is provided with folded sections each end of which is exposed on the upper surface of the movable base, and bottom pieces on which the permanent magnets are mounted, respectively. Therefore, it becomes possible to obtain a precise formation of the permanent magnet by a die-casting method.

The yoke is composed such that each of the bottom pieces is formed in an arc shape with the center of a cylindrical shaft section, which is the same center as that of the movable base and sequentially disposed, and each of the folded sections is provided on each end of the bottom pieces. Therefore, it becomes possible to improve the manufacturing property upon the die-casting of the permanent magnet because the yoke serves as a die-cast per se for forming the permanent magnet.

The movable base is integrally formed with a cylindrical shaft section and a movable arm mounted with the yoke, and further integrally formed with projection sections to be slidably contacted to sliding surfaces of the pole base, respectively, at the inner and outer peripheries of the cylindrical shaft section, respectively. Therefore, it becomes possible to reduce the friction due to the movable base and to improve the smoothness thereof.

Each of the permanent magnets is composed of a magnetic body mounted within the hollowed portion formed with bottom pieces and the folded sections of the yoke by using an injection molding method. Therefore, it becomes possible to reduce the cost for die-casting and the cost of manufacturing.

The yoke is provided with gate holes for injecting the magnetic body to form the permanent magnets on the bottom pieces. Therefore, it becomes possible to avoid the drop out of the permanent magnet from the movable base.

The pole base is integrally formed with the bottom surface through the injection molding method. The pole base is provided with conductive bodies inserted into the pole base through the injection molding method and electrically connected to a substrate mounted with the magnetic sensors. The shaft hole is provided at the end portion of the bottom surface for coupling with the cylindrical shaft section. The sliding surfaces are formed at the periphery of the shaft hole for allowing the sliding motion of the projected section. The sliding surface is formed at the periphery of the bottom surface for allowing the sliding motion of the projected sections. Therefore, it becomes possible to maintain a constant gap between the permanent magnets and the magnetic sensors during normal operation, thereby increasing the sliding property thereof. Moreover, since the movable base does not contact with the substrate, any undesirable influence for the magnetic sensors and electronic elements is avoided.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. An inhibitor switch, comprising:

a movable base provided with permanent magnets and being rotatable in accordance with a transmission operating position of an automatic transmission device;

a pole base provided with magnetic sensors for detecting magnetic flux from said permanent magnets; and a cover body coupled to said pole base and cooperating with said pole base to rotatably support said movable base;

said movable base being insert molded with a yoke inserted therein, said permanent magnets being disposed on said yoke;

said yoke having bottom pieces and folded sections extending from each end of said bottom pieces, a free end of each of said folded sections being exposed on a surface of said movable base, said permanent magnets each being disposed between a respective pair of said folded sections on a respective bottom piece of said yoke, said permanent magnets being exposed on said surface of said movable base.

2. The inhibitor switch according to claim 1, wherein respective pairs of said folded sections extending from each end of said bottom pieces are aligned in a direction of movement of said movable base.

3. The inhibitor switch according to claim 1, wherein said bottom pieces are each formed in an arc shape centered around an axis of a cylindrical shaft section of said movable base which is the same axis about which said movable base is rotatable, said bottom pieces being sequentially disposed at different radial distances from said axis.

4. The inhibitor switch according to claim 3, wherein said movable base is integrally formed with said cylindrical shaft section and a movable arm mounted with said yoke, and further integrally formed with projected sections at inner and outer peripheries of said movable arm to be slidably contacted to respective sliding surfaces of said pole base.

5. The inhibitor switch according to claim 4, wherein each of said permanent magnets is composed of a magnetic body disposed within a hollowed portion defined by said bottom pieces and said folded sections of said yoke upon injection molding said movable base.

6. The inhibitor switch according to claim 4, wherein said pole base has a bottom surface having an arc shape centered around the center of said shaft hole and defines a space for rotatably receiving said movable base, conductive bodies inserted molded into said bottom surface and electrically connected to a substrate mounted with said magnetic sensors, a shaft hole provided at an end portion of said bottom surface for coupling with said cylindrical shaft section, a sliding surface at an outer periphery of said shaft hole on which said projected section is slidably engaged, and a sliding surface at an outer periphery of said bottom surface on which said projected section is slidably engaged.

7. The inhibitor switch according to claim 1, wherein each of said permanent magnets is composed of a magnetic body disposed within a hollowed portion defined by said bottom pieces and said folded sections of said yoke upon injection molding said movable base.

8. The inhibitor switch according to claim 7, wherein said yoke is provided with gate holes on said bottom pieces through which said magnetic body can be injected to form said permanent magnets.

9. The inhibitor switch according to claim 8, wherein said pole base has a bottom surface formed as an arc shape centered around the center of said shaft hole so as to form a space for rotatably receiving said movable base, conductive bodies inserted molded within said bottom surface and electrically connected to a substrate on which said magnetic sensors are mounted, a shaft hole provided at an end portion of said bottom surface for coupling with said cylindrical shaft section, said movable base has projected sections at inner and outer peripheries thereof, and said pole base has a sliding surface formed at an outer periphery of said shaft hole on which a first one of said projected sections is slidably engaged, and a sliding surface formed at an outer periphery of said bottom surface on which a second one of said projected sections is slidably engaged.

10. The inhibitor switch according to claim 1, wherein said movable base is integrally formed with a cylindrical shaft section and a movable arm mounted with said yoke, and further integrally formed with projected sections at inner and outer peripheries of said movable arm which are slidably contacted with respective sliding surfaces of said pole base.

11. An inhibitor switch, comprising:

a movable base comprising a yoke formed of a plurality of arc-shaped metal plates connected with each other integrally, each of said metal plates comprising a bottom piece and folded sections at each end of the bottom piece defining a hollowed portion, and a molded resin surrounding three sides of said metal plates, said movable base being rotatable in accordance with a transmission operating position of an automatic transmission device;

a magnetic material being disposed within each of said hollowed portions;

a pole base provided with magnetic sensors for detecting magnetic flux from said permanent magnets; and a cover body coupled to said pole base and cooperating with said pole base to rotatably support said movable base.

* * * * *